(12) United States Patent
Tapaninen (10) Patent No.: US 9,430,251 B2
(45) Date of Patent: Aug. 30, 2016

(54) SOFTWARE DEVELOPMENT KIT FOR CAPTURING GRAPHICAL IMAGE DATA

(71) Applicant: Applifier Oy, Helsinki (FI)

(72) Inventor: Antti Tapaninen, Helsinki (FI)

(73) Assignee: Unity Technologies Finland Oy, Helsinki (FI)

( * ) Notice: Subject to any disclaimer, the term of this patent is extended or adjusted under 35 U.S.C. 154(b) by 0 days.

(21) Appl. No.: 14/041,117

(22) Filed: Sep. 30, 2013

(65) Prior Publication Data

US 2015/0095874 A1    Apr. 2, 2015

(51) Int. Cl.
*G06F 3/00* (2006.01)
*G06F 9/44* (2006.01)
*G06F 9/445* (2006.01)

(52) U.S. Cl.
CPC ......... *G06F 9/4426* (2013.01); *G06F 9/44521* (2013.01)

(58) Field of Classification Search
None
See application file for complete search history.

(56) References Cited

U.S. PATENT DOCUMENTS

| | | | |
|---|---|---|---|
| 6,104,405 A * | 8/2000 | Idaszak et al. | 345/427 |
| 6,246,678 B1 * | 6/2001 | Erb et al. | 370/352 |
| 7,830,388 B1 * | 11/2010 | Lu | 345/501 |
| 7,916,147 B2 * | 3/2011 | Clemie et al. | 345/522 |
| 2004/0138959 A1 * | 7/2004 | Hlavac et al. | 705/26 |
| 2005/0062762 A1 * | 3/2005 | Wang et al. | 345/643 |
| 2006/0259588 A1 * | 11/2006 | Lerman et al. | 709/219 |
| 2008/0005287 A1 * | 1/2008 | Harvey et al. | 709/220 |
| 2009/0327995 A1 * | 12/2009 | Guo et al. | 717/106 |
| 2011/0157197 A1 * | 6/2011 | Clemie et al. | 345/522 |
| 2012/0114200 A1 * | 5/2012 | Akhriev et al. | 382/118 |
| 2012/0154389 A1 * | 6/2012 | Bohan et al. | 345/419 |
| 2014/0189544 A1 * | 7/2014 | Everitt et al. | 715/760 |

* cited by examiner

*Primary Examiner* — Jason Mitchell
(74) *Attorney, Agent, or Firm* — Ziegler IP Law Group, LLC (57) ABSTRACT

A software development kit for capturing graphical image data is provided. The SDK is arranged to be employed in a device that includes computing hardware that is operable to execute one or more software applications for generating graphical image data. The SDK is arranged to execute concurrently with the software applications. The one or more software applications are operable to make one or more function calls to a graphics engine and/or a graphics library to generate the graphical image data. Meanwhile, the SDK is operable to intercept the function calls made by the one or more software applications to the graphics engine and/or the graphics library. Moreover, the SDK is operable to modify the function calls before these function calls are received by the graphics engine and/or the graphics library to enable the SDK to access, read, copy and/or modify the graphical image data and/or otherwise modify the function calls in any way to control the operations of the graphics engine and/or graphics library.

18 Claims, 6 Drawing Sheets

SOFTWARE DEVELOPMENT KIT FOR CAPTURING GRAPHICAL IMAGE DATA

CROSS-REFERENCE TO RELATED APPLICATION(S)

This application is related to U.S. patent application Ser. No. 13/765,703 filed on 13 Feb. 2013 entitled "System and Method for Sharing Gameplay Experiences" and the disclosure of which is incorporated by reference in its entirety.

TECHNICAL FIELD

The aspects of the present disclosure are related generally to capturing graphical image data, and more specifically, to software development kits for capturing graphical image data. Moreover, the present invention relates to methods of using aforesaid software development kits. Furthermore, the aspects of the present disclosure relate to software products stored on non-transitory (non-transient) machine-readable data storage media, wherein the software products are executable upon computing hardware of a device to implement the aforesaid methods.

BACKGROUND

Today, various operating systems (OS) and graphics apparatus have been developed to support portable devices, namely portable electronic devices. Typically, a graphics apparatus for a portable device includes one or more graphics engines and/or one or more graphics libraries, such as Open Graphics Library (OpenGL). These graphics engines and/or libraries can be called by various applications running on an OS of the portable device, to generate graphical image data to be presented to a user via a graphical display arrangement of the portable device.

Figure 1:
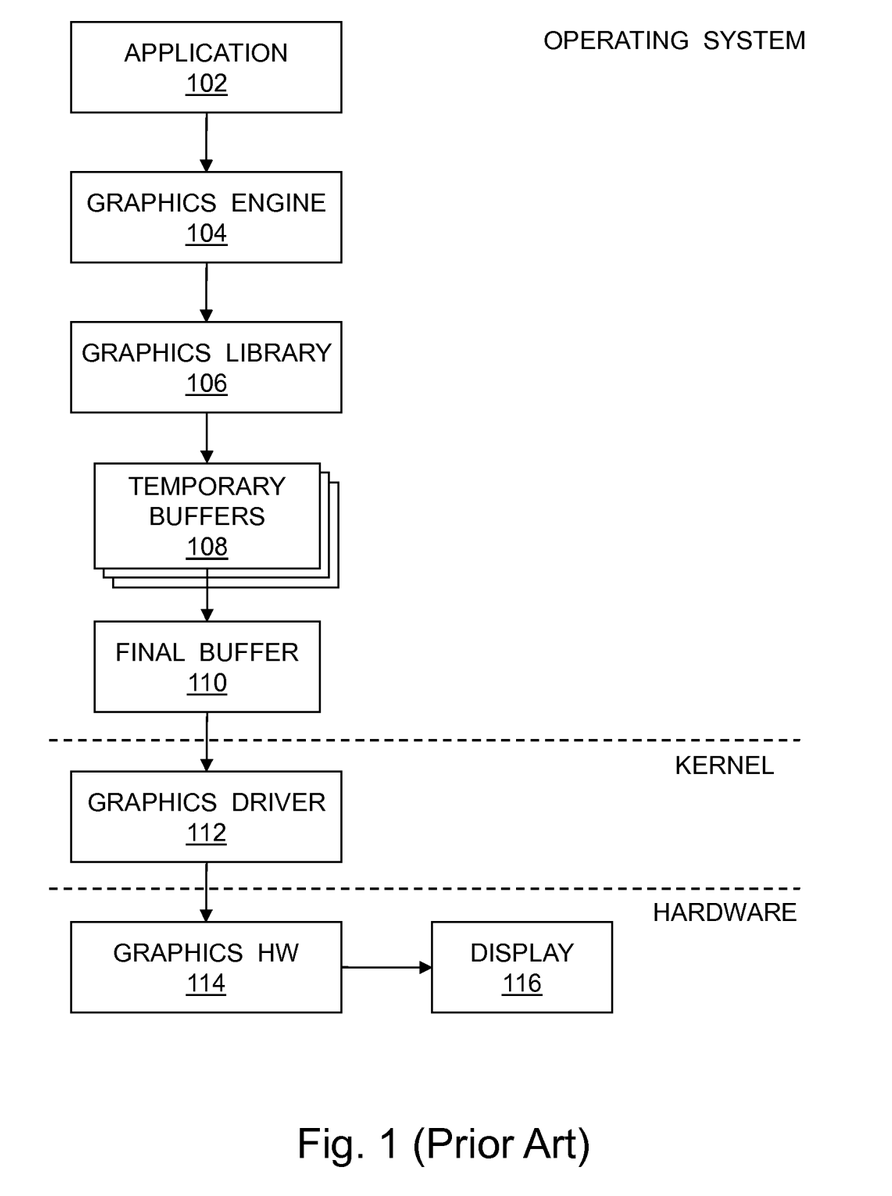
FIG. 1 (Prior Art) is a schematic illustration of a conventional graphics apparatus for a portable device, namely for a portable electronic device.

FIG. 1 is a schematic illustration of a known conventional graphics apparatus for a portable device; FIG. 1 represents prior art. The conventional graphics apparatus may, for example, be used by a software application 102 running on an OS of the portable device to present graphical image data to a user.

With reference to FIG. 1, the conventional graphics apparatus includes a graphics engine 104, a graphics library 106, one or more temporary buffers 108, also known as "framebuffers" to a person skilled in the art, a final buffer 110, a graphics driver 112, graphics hardware 114, and a display 116. The graphics engine 104, the graphics library 106, the one or more temporary buffers 108 and the final buffer 110 may reside in an OS space, as shown in FIG. 1. The graphics driver 112 may be software-enabled in a kernel space. The graphics driver 112 is interfaced with the display 116 via the graphics hardware 114. The graphics hardware 114 may, for example, be an integrated graphics chipset or a dedicated graphics processing unit (GPU). The display 116 may, for example, be a pixel display, such as a touch screen display of the portable device.

In an example, the software application 102 is a gaming application or similar that requires generation and presentation of graphical image data during playing of a game. Moreover, in the example, the software application 102 makes one or more function calls to the graphics engine 104 to generate the graphical image data.

Upon receiving the function calls, the graphics engine 104 computes how to present the state of the software application in graphics and sends one or more corresponding function calls to the graphics library 106, which then generates or modifies the graphical image data in one or more temporary buffers 108. Once all graphical image data for presenting one frame of graphics in the application has been fully generated in one or more temporary buffers, the graphics library 106 composites the temporary buffers together to create the final buffer 110, which may be a new buffer, or one of the temporary buffers. In a situation wherein only one temporary buffer has been generated to present the one frame of graphics, that temporary buffer can be used as the final buffer 110.

Subsequently, the graphical image data in the final buffer 110 is provided to the graphics driver 112. The graphics driver 112 then controls the graphics hardware 114 and/or the display 116 to present the image to the user. When a plurality of image frames per second are presented to the user, the user perceives these image frames combining together to create the effect of moving images on the display 116.

The graphics engine 104 acts as an interface between the software application 102 and the graphics apparatus. It is to be noted here that the graphics engine 104 is typically a part of the software application 102. For example, the graphics engine 104 is simply a routine of the software application 102 calling the graphics library 106. Alternatively, the graphics engine 104 is a full-featured sub-program of the software application 102 responsible for generating or modifying the graphical image data, and/or performing digital image processing on the graphical image data.

The graphics engine 104 may be created by an author of the software application 102, licensed from a third party, or provided by the operating system vendor. In many instances, the software application 102 and/or the graphics engine 104 are not operable to provide any interface to capture the graphical image data generated by the known graphics apparatus.

A conventional technique for facilitating such graphical image data capturing requires modifying the software application 102 and/or the graphics engine 104 to include graphical image data capturing capabilities. For this purpose, an additional software module has to be included as a part of the software application 102. In addition, the graphics engine 104 has to be modified to call the additional software module to capture the graphical image data during the execution of the software application 102.

However, this conventional technique suffers from several disadvantages. Firstly, the software application 102 and/or the graphics engine 104 are required to be modified extensively. Secondly, making such extensive modifications is difficult, time consuming and tedious. Thirdly, in instances where the graphics engine 104 is licensed from a third party, source code of the graphics engine 104 is often closed, and, therefore, cannot be modified by the author of the software application 102. Moreover, the conventional technique is potentially susceptible to result in performance degradation when generating graphical images Another conventional technique for facilitating graphics capturing requires using a third-party software application that has graphics capturing capabilities. However, such third-party software applications are often not suitable for portable devices, due to sandboxing of software applications in the portable devices enforced by operating systems such as Apple iOS and Google Android. The term "sandboxing" refers to a software security practice that prevents a software application from reading data of another software application.

Furthermore, some operating systems may themselves have graphical image data capturing capabilities as a standard feature. However, such graphical image data capturing capabilities are usually not provided in operating systems designed for portable devices.

Therefore, there exists a need for a graphics apparatus for a portable device that is capable of facilitating graphical image data capturing.

SUMMARY

The present disclosure seeks to provide a graphics apparatus for a portable device.

The present disclosure also seeks to provide a Software Development Kit (SDK) for capturing graphical image data.

The present disclosure also seeks to provide a method of using the SDK for capturing aforesaid graphical image data including, for example, screenshots, series of screenshots and/or video.

In one aspect, embodiments of the present disclosure provide an SDK for capturing graphical image data. The SDK is arranged to be employed in a device. The device includes computing hardware that is operable to execute one or more software applications for generating graphical image data, which is viewable via a graphical display arrangement of the device.

Examples of the device include, but are not limited to, a mobile terminal, a mobile telephone, a smart phone, a Mobile Internet Device (MID), a phablet computer, a tablet computer, an Ultra-Mobile Personal Computer (UMPC), a Personal Digital Assistant (PDA), a web pad, a handheld Personal Computer (PC), a laptop computer, an interactive entertainment computer, a gaming terminal, a Television (TV) set, and a Set-Top Box (STB).

The SDK is arranged to execute, upon the computing hardware of the device, concurrently with the software applications.

The software applications are operable to make one or more function calls to a graphics engine and/or a graphics library to generate the graphical image data.

Beneficially, the SDK is operable to wrap around the graphics engine and/or the graphics library, so that the SDK is operable to intercept substantially all function calls to the graphics engine and/or the graphics library, so that those function calls are able to pass through the SDK.

Moreover, the SDK is operable to modify the intercepted function calls before these function calls are received by the graphics engine and/or the graphics library. The SDK optionally modifies these intercepted function calls to enable the SDK to access, read, copy and/or modify the graphical image data generated by the graphics engine and/or the graphics library and/or otherwise modify the function calls in any way to control operations of the graphics engine and/or graphics library.

Moreover, the SDK is optionally operable to copy the graphical image data generated by the graphics engine and/or the graphics library and then to store that copied data in another location on the device's transient memory or in non-transient storage or to send the graphical image data to, for example, video encoding software or hardware which is operable to create one frame of video footage from the graphical image data and to store such video in the memory or non-transient storage on the device.

Moreover, the SDK is optionally operable to upload or stream the graphical image data generated by the graphics engine and/or the graphics library to a data store that is spatially remote from the device.

Furthermore, the SDK is optionally arranged to be integrated into the software applications to become an integral part thereof.

In another aspect, embodiments of the present disclosure provide a method of using the SDK for capturing the graphical image data.

In yet another aspect, embodiments of the present disclosure provide a software product stored on non-transitory (non-transient) machine-readable data storage media, wherein the software product is executable upon computing hardware of the device for implementing the aforementioned method. The software product may, for example, be downloadable from a software application store to the device.

Embodiments of the present disclosure substantially eliminate, or at least partially address, the aforementioned problems in the prior art, and enable users to capture graphical image data generated during, for example, game-playing and facilitate the functionality of capturing the graphical image data, without any requirement to modify software applications and/or graphics engines and/or graphics library, apart from simply including the SDK, namely "linking libraries", in the software applications when corresponding Application Binary Interfaces (ABIs) are created.

In another aspect, the SDK and/or core technologies enabling interception and modification of function calls to the graphics library are optionally included by an operating system vendor as a part of the operating system (OS), thereby enabling capturing of graphical image data for all applications supporting that operating system without requiring those applications to include the SDK.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Embodiments of the present disclosure provide a Software Development Kit (SDK) for capturing graphical image data. The SDK is arranged to be employed in a device, for example a portable device. The device includes computing hardware that is operable to execute one or more software applications for generating graphical image data viewable via a graphical display arrangement of the device.

Examples of the portable device include, but are not limited to, a mobile terminal, a mobile telephone, a smart phone, a Mobile Internet Device (MID), a phablet computer, a tablet computer, an Ultra-Mobile Personal Computer (UMPC), a Personal Digital Assistant (PDA), a web pad, a handheld Personal Computer (PC), a laptop computer, an interactive entertainment computer, a gaming terminal, a Television (TV) set, and a Set-Top Box (STB).

The SDK is arranged to execute, upon the computing hardware of the device, concurrently one or more software applications.

The one or more software applications are operable to make one or more function calls to a graphics engine and/or a graphics library of the device to generate the graphical image data.

Beneficially, the SDK is operable to wrap around the graphics engine and/or the graphics library, so that the SDK is operable intercept substantially all function calls to the graphics engine and/or the graphics library, so that those function calls may pass through the SDK.

Moreover, the SDK is operable to modify the intercepted function calls before these function calls are received by the graphics engine and/or the graphics library. The SDK is optionally operable to modify the function calls to enable the SDK to access, read, copy and/or modify the graphical image data generated by the graphics engine and/or the graphics library or otherwise change a manner in which the graphics engine and/or the graphics library access, generate or modify graphical image data. Examples of image data include any graphics that can be displayed via the device, wherein the image data includes one or more of: video, frame of a video, still image, part of a graphics in the device and similar.

Moreover, the SDK is optionally operable to make a copy of the graphical image data generated by the graphics engine and/or the graphics library and store that copy to another location in the device's transient memory or in non-transient storage or to send the graphical image data to, for example, video encoding software or hardware to create one frame of video footage from the graphical image data and store such video in the memory or non-transient storage of the device.

Moreover, the SDK is optionally operable to upload or stream the graphical image data generated by the graphics engine and/or the graphics library to a data store that is spatially remote from the device.

Furthermore, the SDK is optionally arranged to be integrated into the software applications to become an integral part thereof.

Figure 2:
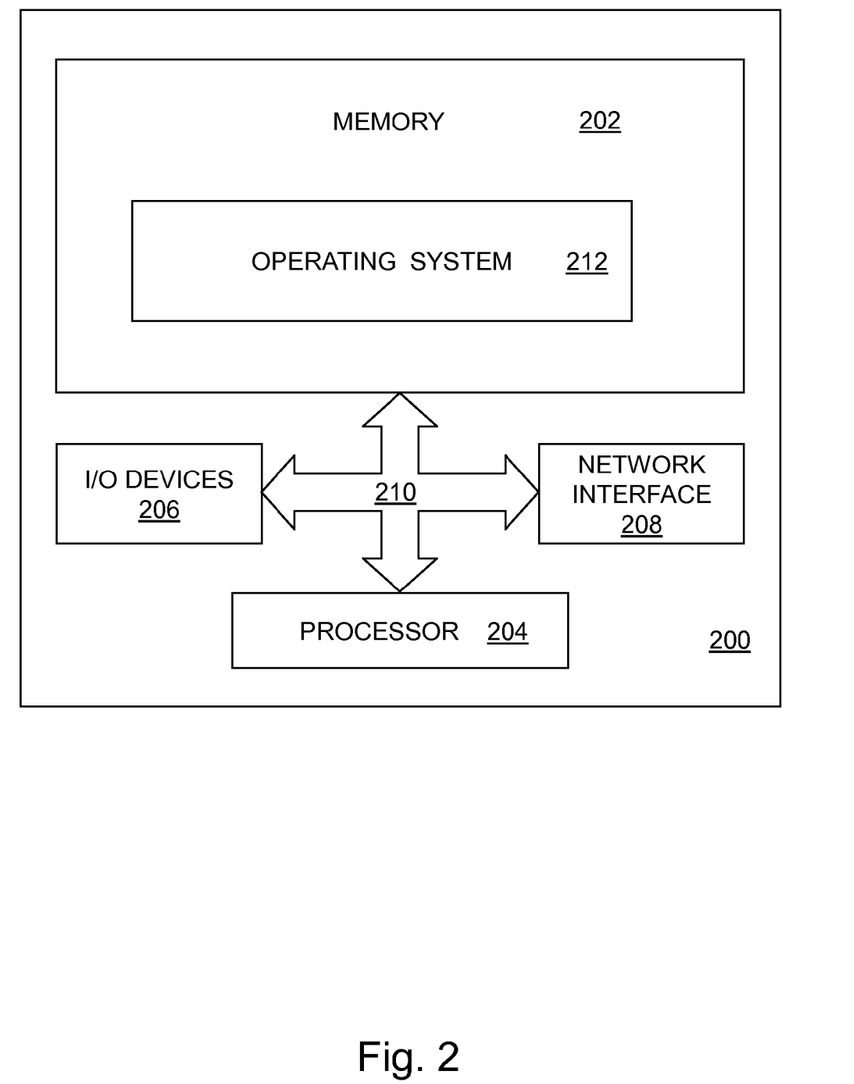
FIG. 2 is a schematic illustration of various components of a device that is suitable for employing a Software Development Kit (SDK) for capturing graphical image data, in accordance with an embodiment of the present disclosure.

Referring now to the drawings, particularly by their reference numbers, FIG. 2 is a schematic illustration of various components of a device 200 that is, for example, suitable for employing an SDK for capturing graphical image data, in accordance with an embodiment of the present disclosure. The device 200 includes, but is not limited to, a data memory 202, computing hardware such as a processor 204, Input/Output (I/O) devices 206, a network interface 208, and a system bus 210 that operatively couples various components including the data memory 202, the processor 204, the I/O devices 206 and the network interface 208. Optionally, the Input/Output (I/O) devices 206 include non-transient data storage arrangements.

The data memory 202 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The memory 202 stores an Operating System (OS) 212 that, when executed on processor 204, provides an interface on which various software applications may be run. In addition, the OS 212 may include a user interface (not shown in FIG. 2) that provides a user of the device 200 with one or more options amongst which to choose.

For example, the user interface optionally allows the user to download a gaming application from a remote server, and to play a game by executing the gaming application upon the processor 204; however, it will be appreciated that software applications other than gaming applications can be alternatively or additionally downloaded. In addition, the user is provided with an option to capture graphical image data generated during playing of the game. Details of a manner in which the graphical image data is captured have been described in conjunction with FIGS. 3, 4 and 5. The graphical image data thereby captured is then optionally stored in the data memory 202. As aforementioned, embodiments described herein are not limited to gaming application, namely capture is potentially usable with any software application.

In addition, the captured graphical image data is optionally shared with other users using other devices via the network interface 208. The network interface 208 optionally allows the device 200 to communicate with other devices, for example, via a communication network (not shown in FIG. 2). In addition, the network interface 208 optionally allows the device 200 to upload or stream the captured graphical image data to a remote server, via a communication network.

The communication network is, for example, a collection of individual networks, interconnected with each other and functioning as a single large network. Such individual networks are optionally wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), second generation (2G) telecommunication networks, third generation (3G) telecommunication networks, fourth generation (4G) telecommunication networks, and Worldwide Interoperability for Microwave Access (WiMAX) networks.

The device 200 is optionally implemented by way of at least one of: a mobile terminal, a mobile telephone, a smart phone, an MID, a phablet computer, a tablet computer, a UMPC, a PDA, a web pad, a handheld PC, a laptop computer, an interactive entertainment computer, a gaming terminal, a TV set, and an Set-Top-Box (STB).

FIG. 2 is merely an example, which should not unduly limit the scope of the claims herein. It is to be understood that the specific designation for the device 200 is provided as an example and is not to be construed as limiting the device 200 to specific numbers, types, or arrangements of modules and/or components of the device 200. A person skilled in the art will recognize many variations, alternatives, and modifications of embodiments of the present disclosure.

Figure 3:
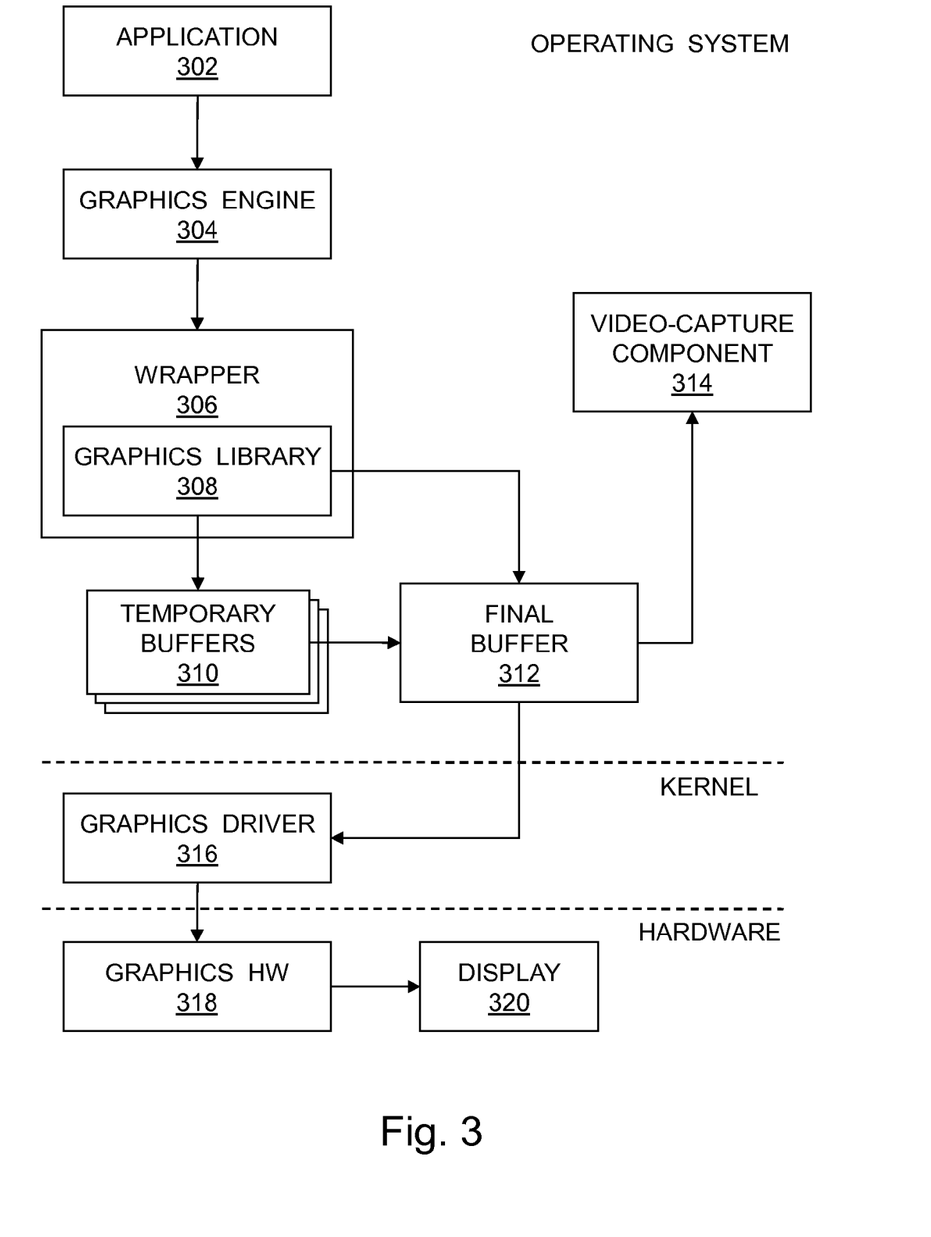
FIG. 3 is a schematic illustration of a graphics apparatus suitable for the device, in accordance with a first embodiment of the present disclosure.

FIG. 3 is a schematic illustration of a graphics apparatus suitable for the device 200, in accordance with a first embodiment of the present disclosure. For illustration purposes, the graphics apparatus is used by a software application 302 executing upon the processor 204 of the device 200.

The graphics apparatus includes a graphics engine 304, a wrapper 306, a graphics library 308, one or more temporary buffers 310, a final buffer 312, a video-capture component 314, a graphics driver 316, graphics hardware 318 and a display 320. The wrapper 306 and the video-capture component 314 form a part of an SDK for capturing graphical image data. The graphics driver 316, the graphics hardware 318 and the display 320 form a part of a graphical display arrangement of the device 200.

In accordance with an embodiment of the present disclosure, the SDK is arranged to execute, upon the processor 204 of the device 200, concurrently with, and optionally as a part of, the software application 302.

The graphics engine 304, the wrapper 306, the graphics library 308, the temporary buffers 310, the final buffer 312 and the video-capture component 314 are optionally stored in the data memory 202 of the device 200, and optionally reside in the OS 212, as shown in FIG. 3 or optionally run inside the OS 212.

For example, the graphics engine 304 is optionally a graphics engine licensed from a third party, such as Object-oriented Graphics Rendering Engine (OGRE), Irrlicht 3D engine, Visual3D game engine, Truevision3D engine, Crystal Space engine, Unity3D game engine, Unreal Engine, Cocos2D engine and the like. The graphics library 308 is optionally implemented via cross-platform graphics library Application Programming Interfaces (API's), such as Open Graphics Library (OpenGL) API, Direct3D API, EA Graphics Library (EAGL) API, Embedded-system Graphics Library (EGL) API and the like.

In addition, the graphics driver 316 is optionally software-enabled in a kernel of operating system (OS). The graphics driver 316 is optionally a system-supplied driver component, a vendor-supplied driver component, or a combination thereof. The graphics driver 316 is interfaced with the display 320 via the graphics hardware 318. The graphics hardware 318 is optionally, for example, an integrated graphics chipset or a dedicated graphics processing unit (GPU) of the device 200. The display 320 is optionally, for example, a pixel display, such as a touch screen display of the device 200.

In an example embodiment, the software application 302 is a gaming application that requires generation of graphical image data viewable via the graphical display arrangement of the device 200 during playing of a game. Moreover, the user of the device 200 opts in the example embodiment to capture the graphical image data generated during playing of the game.

In order to generate the graphical image data, the software application 302 makes one or more function calls to the graphics engine 304. The graphics engine 304 acts as an interface between the software application 302 and graphics apparatus.

The graphics engine 304 is typically implemented, at least in part, in the software application 302. Alternatively, the graphics engine 304 is optionally implemented as an entirely separate routine from the software application 302. The graphics engine 304 is optionally either created by an author of the software application 302, or licensed from a third party.

Upon receiving the function calls, the graphics engine 304 computes a manner in which to present the software application's state in graphics, and makes one or more function calls to the graphics library 308. This initiates the wrapper 306, which is operable to intercept the function calls made by the graphics engine 304 to the graphics library 308.

Beneficially, the wrapper 306 is operable to wrap around the graphics library 308 so that substantially all function calls to the graphics library 308 pass through the wrapper 306. It should be noted that the wrapper 306 is part of the application 302.

The wrapper 306 is operable to modify the function calls before these function calls are received by the graphics library 308 to enable the SDK to access, read, copy and/or modify the graphical image data generated by the graphics engine 304 and/or the graphics library 308 and/or otherwise modify the function calls in any way to control the operation of the graphics library 308.

Moreover, the SDK is optionally operable to make a copy of the graphical image data generated by the graphics engine 304 and/or the graphics library 308 from the temporary buffers 310 and/or the final buffer 312. When a particular function call passes through the wrapper 306, the wrapper 306 modifies that particular function call before it is received by the graphics library 308, so as to control the graphics library 308 in such a way that the video-capture component 314 can copy the graphical image data from the temporary buffers 310 and/or the final buffer 312.

In a case where the graphics engine 304 uses only one temporary buffer 310, that temporary buffer 310 is optionally also used as the final buffer 312, and the modifications the SDK has done or does to the function calls enables the video-capture component to read the data generated or modified by the graphics library 308 in that buffer. When the graphics engine 304 completes drawing an image frame in that buffer, the graphics engine 304 calls the graphics library 308 to present the completed image frame to the user. Accordingly, the wrapper 306 ensures that the video-capture component 314 stores a copy of the final buffer 312 elsewhere in the device memory after which the graphics library 308 calls the graphics driver 316 to present the final buffer 312 to the user. In an alternative embodiment, the video-capture component 314 can store a copy of the temporary buffer 310 or the final buffer 312 before the image frame has been fully drawn, namely to capture graphical image data before certain graphical elements such as user interface elements have been generated in that corresponding buffer.

In another case where the graphics engine 304 uses multiple buffers, namely, the one or more temporary buffers 310, the graphics library 308 writes the graphical image data to the one or more temporary buffers 310. When the graphics engine 304 completes drawing an image frame in the one or more temporary buffers 310, the graphics engine 304 calls the graphics library 308 to present the composited image frame to the user. Accordingly, the wrapper 306 ensures that the graphics library 308 composites the graphical image data from the one or more temporary buffers 310 into the final buffer 312, which is readable by the video-capture component 314. Once the composition is finished, the video-capture component 314 will store a copy of the composited graphical image data from the final buffer 312 elsewhere in the device memory after which the graphics driver 316 will present the final buffer 312 to the user. In an alternative embodiment, the video-capture component 314 is operable to store a copy of the temporary buffer 310 or the final buffer 312 before the frame has been finished, namely to capture graphical image data before certain graphical elements such as user interface elements have been generated.

Upon receiving the completed image frame, the graphics driver 316 controls the graphics hardware 318 and/or the display 320 to present the completed image frame to the user.

Meanwhile, the video-capture component 314 is operable to capture the graphical image data written into any of the temporary buffers 310 or final buffer 312, and to store the graphical image data in the memory 202, or into another internal storage of the device 200 locally, or further process it, for example by using a video encoder software or hardware, to compress frames of the graphical image data into a video file. The graphical image data thereby stored is optionally, for example, used to regenerate image frames at a later time, for example to provide a video recording of the operation of the software application 302.

Beneficially, the video-capture component 314 is optionally operable to upload and/or stream content of the final buffer 312 to a data store that is spatially remote from the device 200. The content is optionally streamed from the data store to one or more devices of other users, for example, for purposes of sharing game-playing experiences, but not limited thereto.

Furthermore, the SDK, including the wrapper 306 and the video-capture component 314, are optionally arranged to be integrated into the software application 302 to become an integral part thereof. The wrapper 306 and the video-capture component 314 are optionally included in an Application Binary Interface (ABI) of the software application 302, for example, when the software application 302 is linked together with object code libraries. Such linking is beneficially, for example, performed when an executable file is created, or whenever the software application 302 is used at run time. Consequently, the wrapper 306 and the video-capture component 314 optionally become a part of the software application 302 in a transparent manner, for example, as implemented by software developers.

Moreover, the software application 302 is optionally operable to allow the user to "enable" or "disable" graphics capturing functionalities provided by the SDK.

Optionally, the software application 302, the graphics engine 304 and/or the graphics library 308 are not substantially required to be modified, apart from linking the SDK with the software Application Binary Interface (ABI).

Now, when the software application 302 calls the graphics engine 304 to generate the graphical image data, the graphics engine 304, intending to call the graphics library 308, instead transparently calls the wrapper 306. Subsequently, the wrapper 306 modifies the function calls before passing them through to configure the graphics library 308, so that the video-capture component 314 has full access to the graphical image data generated, for example to read, copy and modify such data, thereby facilitating capturing of the graphical image data generated by the graphics engine 304 and/or the graphics library 308.

Alternatively, the SDK is optionally arranged to be integrated into the OS 212 to become an integral part thereof. This beneficially provides graphics capturing functionalities to any software application running on the OS 212. In such a case, the OS 212 optionally provides a feature that allows the user of the device 200 to control the graphics capturing functionalities, for example on per software-application basis.

Such an implementation beneficially enables hardware manufacturers to manufacture a portable device that uses the OS 212 to provide a system-wide graphics capturing functionality to all the software applications running on the portable device. Moreover, in a case of open-source operating systems, this beneficially enables individual developers to modify the open-source operating systems to include the system-wide graphics capturing functionality.

Beneficially, executing the wrapper 306 does not lead to measurable performance degradation, as the wrapper 306 does not generate the graphical image data itself. However, capturing the graphical image data by the video-capture component 314, and storing or compressing such graphical image data into a video file potentially results in some performance degradation, which can be substantially ignored when compared with performance degradation caused by executing the software application 302.

FIG. 3 is merely an example, which should not unduly limit the scope of the claims herein. The specific designation for the graphics apparatus is not to be construed as limiting the graphics apparatus to specific numbers, types, or arrangements of modules, routines, software products, components and/or APIs of the graphics apparatus. A person skilled in the art will recognize many variations, alternatives, and modifications of embodiments of the present disclosure.

For example, a video apparatus is optionally implemented on the device 200 in a manner similar to the graphics apparatus, to capture video and/or digital audio data along with the graphical image data generated during the playing of the game. A video file consisting of the digital audio data along with the graphical image data is then beneficially uploaded or streamed to a remote server and/or shared with other users.

Figure 4:
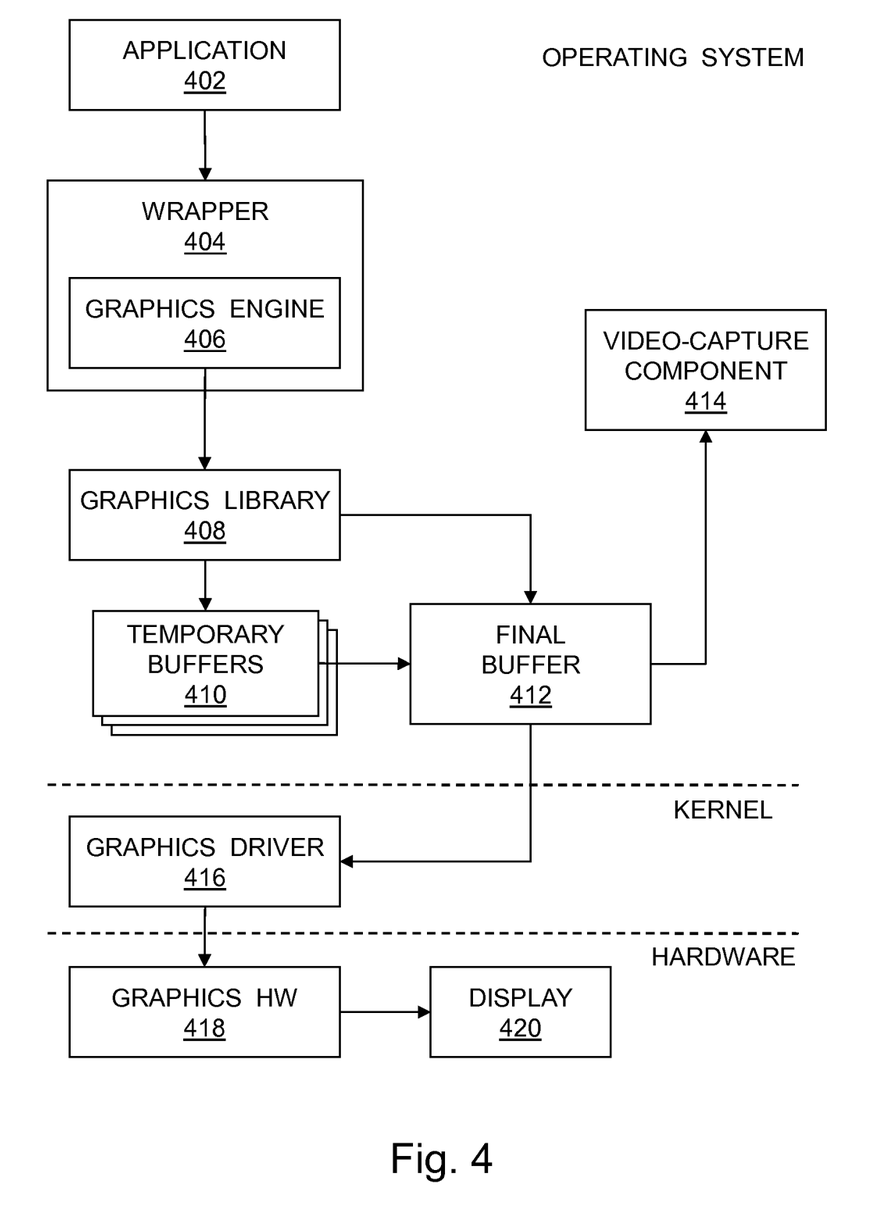
FIG. 4 is a schematic illustration of a graphics apparatus suitable for the device, in accordance with a second embodiment of the present disclosure.
Figure 5:
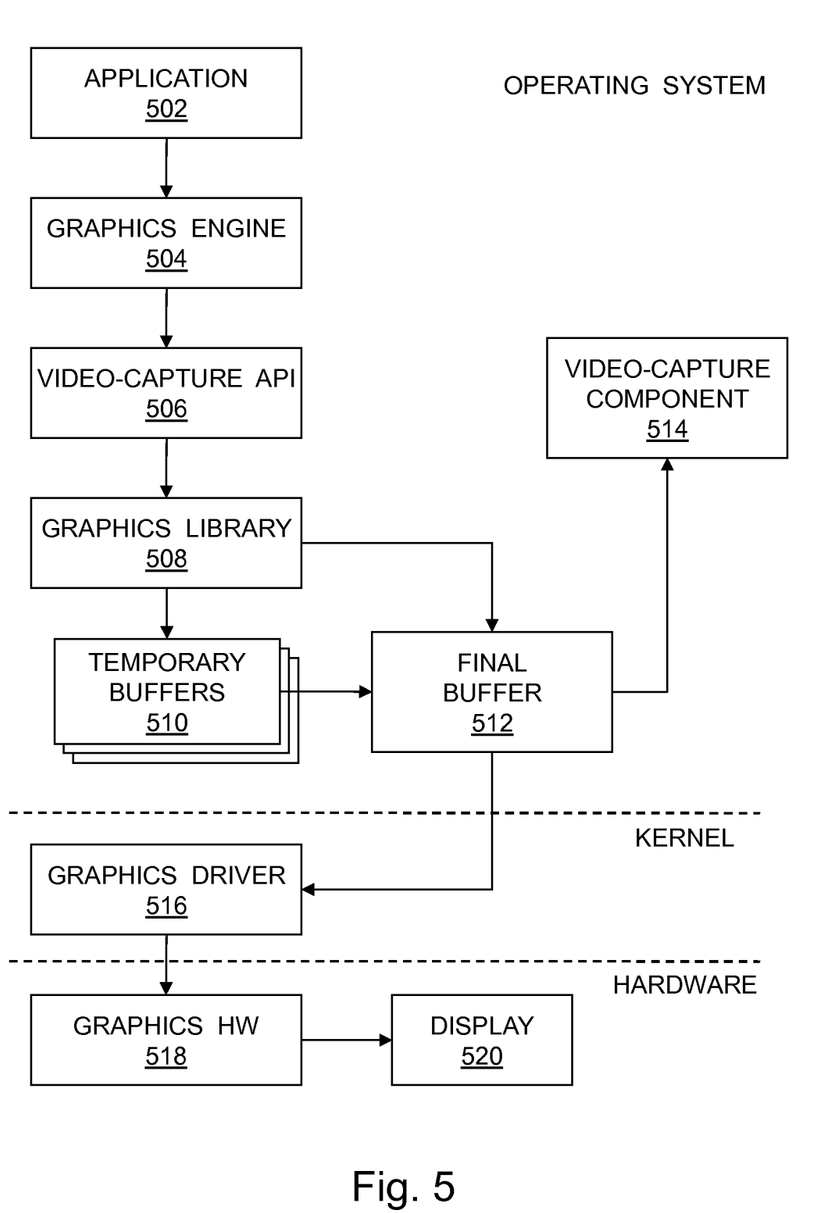
FIG. 5 is a schematic illustration of a graphics apparatus suitable for the device, in accordance with a third embodiment of the present disclosure.

FIG. 4 is a schematic illustration of a graphics apparatus suitable for the device 200, in accordance with a second embodiment of the present disclosure; description of features in FIG. 3 pertains mutatis mutandis to FIG. 4 and FIG. 5, except where stated otherwise. For illustration purposes, the graphics apparatus is used by a software application 402 executing upon the processor 204 of the device 200.

The graphics apparatus includes a wrapper 404, a graphics engine 406, a graphics library 408, one or more temporary buffers 410, a final buffer 412, a video-capture component 414, a graphics driver 416, graphics hardware 418 and a display 420. The wrapper 404, the final buffer 412 and the video-capture component 414 form a part of an SDK for capturing graphical image data. The graphics driver 416, the graphics hardware 418 and the display 420 form a part of the graphical display arrangement of the device 200.

In accordance with an embodiment of the present disclosure, the SDK is arranged to execute, upon the processor 204 of the device 200, concurrently with, and optionally as a part of, the software application 402.

The wrapper 404, the graphics engine 406, the graphics library 408, the temporary buffers 410, the final buffer 412 and the video-capture component 414 are optionally stored in the data memory 202 of the device 200, and optionally reside in the OS 212, as shown in FIG. 4 or optionally run inside the OS 212.

For example, the graphics engine 406 is optionally a graphics engine licensed from a third party, such as Object-oriented Graphics Rendering Engine (OGRE) Irrlicht 3D engine, Visual3D game engine, Truevision3D engine, Crystal Space engine, Unity3D game engine, Unreal Engine, Cocos2D and the like. The graphics library 408 is optionally implemented via cross-platform graphics library APIs, such as OpenGL API, Direct3D API, EAGL API, EGL API and the like.

In addition, the graphics driver 416 is optionally software-enabled in the kernel of operating system (OS). The graphics driver 416 is optionally a system-supplied driver component, a vendor-supplied driver component, or a combination thereof. The graphics driver 416 is interfaced with the display 420 via the graphics hardware 418. The graphics hardware 418 is optionally, for example, an integrated graphics chipset or a dedicated graphics processing unit (GPU) of the device 200. The display 420 is, for example, a pixel display, such as a touch screen display of the device 200.

In an example embodiment, the software application 402 is a gaming application that requires generation of graphical image data viewable via the graphical display arrangement of the device 200 during playing of a game. Moreover, the user of the device 200 opts in the example embodiment to capture the graphical image data generated during playing of the game.

In order to generate the graphical image data, the software application 402 makes one or more function calls to the graphics engine 406. The graphics engine 406 acts as an interface between the software application 402 and graphics apparatus.

The graphics engine 406 is typically implemented as part of the software application 402. Alternatively, the graphics engine 406 is implemented as an entirely separate routine from the software application 402. The graphics engine 406 is optionally either created by an author of the software application 402, or licensed from a third party.

When the software application 402 makes the function calls to the graphics engine 406, the wrapper 404 is initiated. The wrapper 404 is operable to intercept the function calls made by the software application 402 to the graphics engine 406.

Beneficially, the wrapper 404 is optionally operable to wrap around the graphics engine 406 so that substantially all function calls to and/or from the graphics engine 406 may pass through the wrapper 404. It should be noted that the wrapper 404 is part of the application 402.

Upon receiving the function calls, the graphics engine 406 computes a manner in which to present the software application's state in graphics, and makes one or more function calls to the graphics library 408. Accordingly, the wrapper 404 is operable to intercept the function calls made by the graphics engine 406 to the graphics library 408.

In order to capture the graphical image data, the wrapper 404 is operable to modify the function calls before these function calls are received by the graphics engine 406 and/or the graphics library 408 to enable the SDK to access, read, copy and/or modify the graphical image data generated by the graphics engine 406 and/or the graphics library 408 and/or otherwise modify the function calls in any way to control the operation of the graphics engine 406 and/or graphics library 408.

Moreover, the SDK is optionally operable to make a copy of the graphical image data generated by the graphics engine 406 and/or the graphics library 408 from the temporary buffers 410 and/or final buffer 412. When a particular function call passes through the wrapper 404, the wrapper 404 modifies that particular function call before it is received by the graphics engine 406 and/or the graphics library 408, so as to control the graphics engine 406 and/or the graphics library 408 in such a way that the video-capture component 414 can copy the graphical image data from the temporary buffers 410 and/or final buffer 412.

In a case where the graphics engine 406 uses only one temporary buffer 410, that temporary buffer is optionally also used as the final buffer 412, and the modifications the SDK has done or does to the function calls enables the video-capture component to read the data generated or modified by the graphics library 408 in that buffer. Accordingly, the wrapper 404 ensures that the video-capture component 414 stores a copy of the final buffer 412 elsewhere in the device memory after which the graphics library 408 calls the graphics driver 416 to present the final buffer 412 to the user. In an alternative embodiment, the video-capture component can store a copy of the temporary buffer 410 or the final buffer 412 before the image frame has been fully drawn, namely to capture graphical image data before certain graphical elements such as user interface elements have been generated in that corresponding buffer.

In another example situation where the graphics engine 406 uses multiple buffers, namely, the temporary buffers 410, the graphics library 408 writes the graphical image data to the temporary buffers 410. When the graphics engine 406 completes drawing an image frame in the temporary buffers 410, the graphics engine 406 calls the graphics library 408 to present the composited image frame to the user. Accordingly, the wrapper 404 ensures that the graphics library 408 composites the graphical image data from the one or more temporary buffers 410 into the final buffer 412, which is readable by the video-capture component 414. Once the composition is finished, the video-capture component 414 will store a copy of the composited graphical image data from the final buffer 412 elsewhere in the device memory after which the graphics driver 416 will present the final buffer 412 to the user. In an alternative embodiment, the video-capture component 414 is operable to store a copy of the temporary buffer 410 or the final buffer 412 before the frame has been finished, namely to capture graphical image data before certain graphical elements such as user interface elements have been generated.

Upon receiving the completed image frame, the graphics driver 416 controls the graphics hardware 418 and/or the display 420 to present the completed image frame to the user.

Meanwhile, the video-capture component 414 is operable to capture the graphical image data written into any of the temporary buffers 410 or final buffer 412, and to store the graphical image data in the memory 202, or into another internal storage of the device 200 locally, or further process it, for example by using a video encoder software or hardware, to compress frames of the graphical image data into a video file. The graphical image data thereby stored is optionally, for example, used to regenerate image frames at a later time, for example to provide a video recording of the operation of the software application 402.

Beneficially, the video-capture component 414 is optionally operable to upload and/or stream content of the final buffer 412 to a data store that is spatially remote from the device 200. The content is optionally streamed from the data store to one or more devices of other users, for example for purposes of sharing game-playing experiences, but not limited thereto.

Furthermore, the SDK, including the wrapper 404 and the video-capture component 414, are optionally arranged to be integrated into the software application 402 to become an integral part thereof. The wrapper 404 and the video-capture component 414 are optionally included in an Application Binary Interface (ABI) of the software application 402, for example, when the software application 402 is linked together with object code libraries. Such linking is beneficially, for example, performed when an executable file is created, or whenever the software application 402 is used at run time. Consequently, the wrapper 404 and the video-capture component 414 optionally become a part of the software application 402 in a transparent manner, for example, as implemented by software developers.

Moreover, the software application 402 is optionally operable to allow the user to "enable" or "disable" graphics capturing functionalities provided by the SDK.

Optionally, the software application 402, the graphics engine 406 and/or the graphics library 408 are not required to be modified, apart from linking the SDK with the software Application Binary Interface (ABI).

Now, when the software application 402 calls the graphics engine 406 to generate the graphical image data, the software application 402 instead transparently calls the wrapper 404. Subsequently, the wrapper 404 modifies the function calls before passing them through to configure the graphics engine 406 and/or the graphics library 408, so that the video-capture component 414 has full access to the graphical image data generated, for example to read, copy and modify such data, thereby facilitating capturing of the graphical image data generated by the graphics engine 406 and/or the graphics library 408.

Beneficially, executing the wrapper 404 does not lead to measurable performance degradation, as the wrapper 404 does not generate the graphical image data itself. However, capturing the graphical image data by the video-capture component 414, and storing or compressing such graphical image data into a video file potentially results in some performance degradation, which can be substantially ignored when compared with performance degradation caused by executing the software application 402.

FIG. 4 is merely an example, which should not unduly limit the scope of the claims herein. It is to be understood that the specific designation for the graphics apparatus is not to be construed as limiting the graphics apparatus to specific numbers, types, or arrangements of modules, routines, software products, components and/or APIs of the graphics apparatus. A person skilled in the art will recognize many variations, alternatives, and modifications of embodiments of the present disclosure.

For example, a video apparatus is optionally implemented on the device 200 in a manner similar to the graphics apparatus, to capture video and/or digital audio data along with the graphical image data generated during the playing of the game. A video file consisting of the digital audio data along with the graphical image data is then beneficially uploaded to a remote server and/or shared with other users.

FIG. 5 is a schematic illustration of a graphics apparatus suitable for the device 200, in accordance with a third embodiment of the present disclosure. For illustration purposes, the graphics apparatus is, for example, used by a software application 502 executing upon the processor 204 of the device 200.

The graphics apparatus includes a graphics engine 504, a video-capture API 506, a graphics library 508, one or more temporary buffers 510, a final buffer 512, a video-capture component 514, a graphics driver 516, graphics hardware 518 and a display 520. The video-capture API 506 and the video-capture component 514 form a part of an SDK for capturing graphical image data. The graphics driver 516, the graphics hardware 518 and the display 520 form a part of the graphical display arrangement of the device 200.

In accordance with an embodiment of the present disclosure, the SDK is arranged to execute, upon the processor 204 of the device 200, concurrently with, and optionally as a part of, the software application 502.

The graphics engine 504, the video-capture API 506, the graphics library 508, the temporary buffers 510, the final buffer 512 and the video-capture component 514 are optionally stored in the data memory 202 of the device 200, and optionally reside in the OS 212, as shown in FIG. 5 or optionally run inside the OS 212.

For example, the graphics engine 504 is optionally a graphics engine licensed from a third party, such as OGRE, Irrlicht 3D engine, Visual3D game engine, Truevision3D engine, Crystal Space engine, Unity3D, Unreal Engine, Cocos2D and the like. The graphics library 508 is optionally implemented via cross-platform graphics library APIs, such as OpenGL API, Direct4D API, EAGL API, EGL API and the like.

In addition, the graphics driver 516 is optionally software-enabled in the kernel of the device 200. The graphics driver 516 is optionally a system-supplied driver component, a vendor-supplied driver component, or a combination thereof. The graphics driver 516 is interfaced with the display 520 via the graphics hardware 518. The graphics hardware 518 is optionally, for example, an integrated graphics chipset or a dedicated graphics processing unit (GPU) of the device 200. The display 520 is optionally, for example, a pixel display, such as a touch screen display of the device 200.

In an example embodiment, the software application 502 is a gaming application that requires generation of graphical image data viewable via the graphical display arrangement of the device 200 during playing of a game. Moreover, the user of the device 200 opts in the example embodiment to capture the graphical image data generated during playing of the game.

In order to generate the graphical image data, the software application 502 makes one or more function calls to the graphics engine 504. The graphics engine 504 acts as an interface between the software application 502 and the graphics apparatus.

The graphics engine 504 is optionally implemented, at least in part, in the software application 502. Alternatively, the graphics engine 504 is optionally implemented as an entirely separate routine from the software application 502. The graphics engine 504 is optionally either created by an author of the software application 502, or licensed from a third party.

It will be appreciated here that the software application 502 and/or the graphics engine 504 is modified explicitly to integrate with the video-capture API 506. In one example, the graphics engine 504 is optionally modified by the author of the software application 502 in a case when the graphics engine 504 is an open-source graphics engine. In another example, the graphics engine 504 is optionally modified by an author of the graphics engine 504.

In this implementation, the graphics engine 504 is modified explicitly to call the video-capture API 506, which provides graphics capturing functionalities. Consequently, upon receiving the function calls from the software application 502, the graphics engine 504 makes function calls to the video-capture API 506 to enable video capture and explicitly sends certain function calls intended to the graphics library 508 to the video-capture API 506.

In order to capture the graphical image data, the video-capture API 506 is operable to modify the function calls before these function calls are sent from the video-capture API 506 to the graphics library 508 to enable the SDK to access, read, copy and/or modify the graphical image data generated by the graphics engine 504 and/or the graphics library 508.

Moreover, the SDK is optionally operable to make a copy of the graphical image data generated by the graphics engine 504 and/or the graphics library 508 from the temporary buffers 510 and/or the final buffer 512. When a particular function call passes through the video-capture API 506, the video-capture API 506 modifies that particular function call before it is sent to the graphics library 508, so as to control the graphics library 508 in such a way that the video-capture component 514 can copy the graphical image data from the temporary buffers 510 and/or the final buffer 512.

In a case where the graphics engine 504 uses only one buffer, the graphics library 508, that temporary buffer 510 is optionally also used as the final buffer 512, and the modifications the SDK has done or does to the function calls enables the video-capture component to read the data generated or modified by the graphics library 508 in that buffer. When the graphics engine 504 completes drawing an image frame in that buffer, the graphics engine 504 calls the video-capture API 506, which then calls the graphics library 508 to present the completed image frame to the user. Accordingly, the video-capture API 506 ensures that the video-capture component 514 stores a copy of the final buffer 512 elsewhere in the device memory after which the graphics library 508 calls the graphics driver 516 to present the final buffer 512 to the user. In an alternative embodiment, the video-capture component 514 can store a copy of the temporary buffer 510 or the final buffer 512 before the image frame has been fully drawn, namely to capture graphical image data before certain graphical elements such as user interface elements have been generated in that corresponding buffer.

In another case where the graphics engine 504 uses multiple buffers, namely, the temporary buffers 510, the graphics library 508 writes the graphical image data to the temporary buffers 510. When the graphics engine 504 completes drawing an image frame in the temporary buffers 510, the graphics engine 504 calls the video-capture API 506, which then calls the graphics library 508 to present the completed image frame to the user. Accordingly, the video-capture API 506 ensures that the graphics library 508 composites the graphical image data from the temporary buffers 510 into the final buffer 512, which is readable by the video-capture component 514. Once the composition is finished, the video-capture component 514 will store a copy of the composited graphical image data from the final buffer 512 elsewhere in the device memory after which the graphics driver 516 will present the final buffer 512 to the user. In an alternative embodiment, the video-capture component 514 is operable to store a copy of the temporary buffer 510 or the final buffer 512 before the frame has been finished, namely to capture graphical image data before certain graphical elements such as user interface elements have been generated.

Upon receiving the completed image frame, the graphics driver 516 controls the graphics hardware 518 and/or the display 520 to present the completed image frame to the user.

Meanwhile, the video-capture component 514 is operable to capture the graphical image data written into any of the temporary buffers 510 or the final buffer 512, and to store the graphical image data in the memory 202 or into another internal storage of the device 200 locally, or further process it, for example by using a video encoder software or hardware, to compress frames of the graphical image data into a video file. The graphical image data thereby stored is optionally, for example, used to regenerate image frames at a later time, for example to provide a video recording of the operation of the software application 502.

Beneficially, the video-capture component 514 is optionally operable to upload and/or stream content of the final buffer 512 to a data store that is spatially remote from the device 200. The content is optionally streamed from the data store to one or more devices of other users, for example, for purposes of sharing game-playing experiences, but not limited thereto.

Furthermore, the SDK, including the video-capture API 506 and the video-capture component 514, are optionally arranged to be integrated into the software application 502 to become an integral part thereof. The video-capture API 506 and the video-capture component 514 are optionally included in an Application Binary Interface (ABI) of the software application 502, for example, when the software application 502 is linked together with object code libraries. Such linking is beneficially, for example, performed when an executable file is created, or whenever the software application 502 is used at run time. Consequently, the video-capture API 506 and the video-capture component 514 optionally become a part of the software application 502.

Moreover, the software application 502 is optionally operable to allow the user to "enable" or "disable" graphics capturing functionalities provided by the SDK.

Now, when the software application 502 calls the graphics engine 504 to generate the graphical image data, the graphics engine 504, explicitly calls the video-capture API 506. Subsequently, the video-capture API 506 modifies the function calls before passing them through to configure the graphics library 508, so that the video-capture component 514 has full access to the graphical image data generated, for example to read, copy and modify such data, thereby facilitating capturing of the graphical image data generated by the graphics engine 504 and/or the graphics library 508.

Beneficially, executing the video-capture API 506 does not lead to measurable performance degradation, as the video-capture API 506 does not generate the graphical image data itself. However, capturing the graphical image data by the video-capture component 514 and storing or compressing it into video format potentially results in some performance degradation, which can be substantially ignored when compared with performance degradation caused by executing the software application 502.

FIG. 5 is merely an example, which should not unduly limit the scope of the claims herein. It is to be understood that the specific designation for the graphics apparatus is not to be construed as limiting the graphics apparatus to specific numbers, types, or arrangements of modules, routines, software products, components and/or APIs of the graphics apparatus. A person skilled in the art will recognize many variations, alternatives, and modifications of embodiments of the present disclosure.

For example, a video apparatus is optionally implemented on the device 200 in a manner similar to the graphics apparatus, to capture video and/or digital audio data along with the graphical image data generated during the playing of the game. A video file consisting of the digital audio data along with the graphical image data is then beneficially uploaded to a remote server and/or shared with other users.

Figure 6:
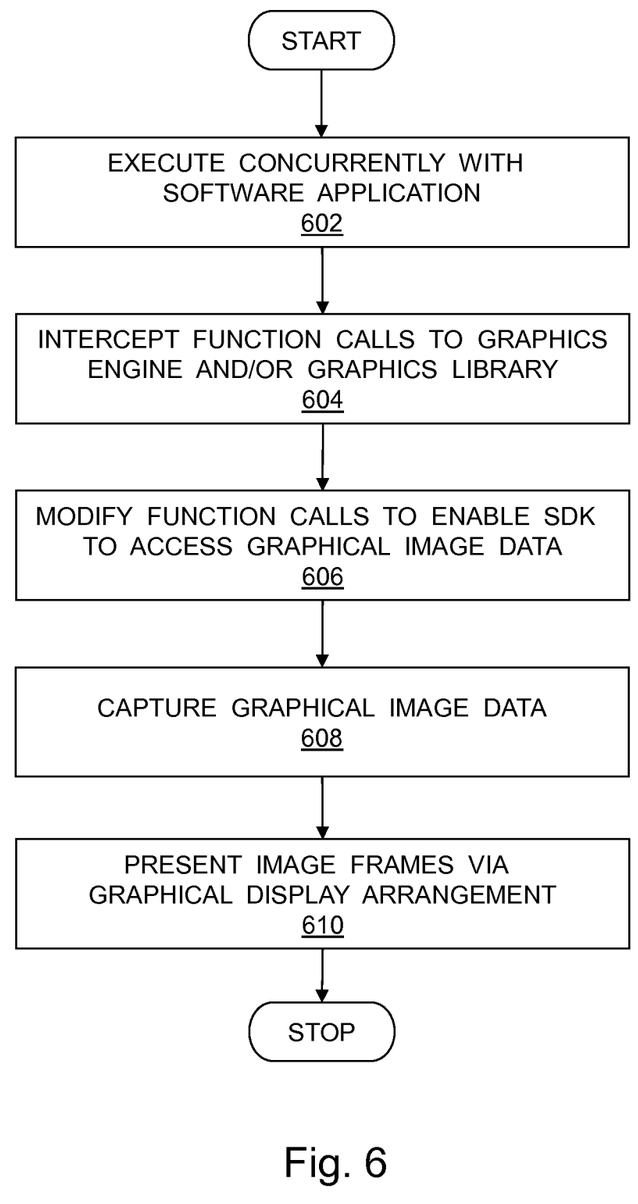
FIG. 6 is an illustration of steps of a method of using the SDK for capturing graphical image data, in accordance with an embodiment of the present disclosure.

FIG. 6 is an illustration of steps of a method of using an SDK for capturing graphical image data, in accordance with an embodiment of the present disclosure. The method is depicted as a collection of steps in a logical flow diagram, which represents a sequence of steps that can be implemented in hardware, software, or a combination thereof.

As described earlier, the SDK is arranged to be employed in a device, such as the device 200. The device includes computing hardware that is operable to execute one or more software applications for generating graphical image data viewable via a graphical display arrangement of the device.

At a step 602, the SDK is arranged to execute, upon the computing hardware of the device, concurrently with the software applications. In accordance with the step 602, the SDK is optionally, for example, initiated when the software application makes one or more function calls to a graphics engine and/or a graphics library.

At a step 604, the SDK operates to intercept the function calls made by the software applications to the graphics engine and/or the graphics library; alternatively, or additionally, in the embodiment described with reference to FIG. 5, the function calls are explicitly sent to the video-capture API 506.

In accordance with the step 604, the SDK optionally operates to wrap around the graphics engine and/or the graphics library so that substantially all function calls to the graphics engine and/or the graphics library pass through the SDK.

Next, at a step 606, the SDK operates to modify the function calls before these function calls are received by the graphics engine and/or the graphics library, as described earlier. This enables the SDK to access, read, copy and/or modify the graphical image data generated by the graphics engine and/or the graphics library, and/or otherwise modify the function calls in any way to control the operations of the graphics engine and/or graphics library.

In accordance with the step 606, the SDK optionally configures the graphics engine and/or the graphics library to enable the video-capture component 314, 414, 514 to access, read, copy and/or modify the graphical image data generated by the graphics engine and/or the graphics library and/or otherwise modify the function calls in any way to control the operations of the graphics engine and/or graphics library.

Subsequently, at a step 608, the SDK operates to capture the graphical image data generated or modified in the temporary buffers 310, 410, 510 or in the final buffer 312, 412, 512, as described earlier. The video-capture component is optionally implemented in a manner that is similar to the implementation of the video-capture component 314, video-capture component 414 or the video-capture component 514.

The graphical image data captured at the step 608 may be stored in an internal data memory of the device locally.

Moreover, the method optionally includes an additional step at which the SDK operates to upload and/or stream content of the video-capture buffer to a data store that is spatially remote from the device.

Meanwhile, a step 610, image frames in the final buffer are presented to a user via the graphical display arrangement of the device.

The step 608 and the step 610 are optionally, for example, performed simultaneously.

Furthermore, the method includes an optional step at which the SDK is arranged to be integrated into the software applications to become an integral part thereof; preferably, this is a default for embodiments of the disclosure.

The steps 602 to 610 are only illustrative and other alternatives can also be provided where one or more steps are added, one or more steps are removed, or one or more steps are provided in a different sequence without departing from the scope of the claims herein.

Embodiments of the present disclosure provide a software product stored on non-transitory (non-transient) machine-readable data storage media, wherein the software product is executable upon the computing hardware of the device 200 for implementing the method as described in conjunction with FIG. 6. The software product is optionally, for example, downloadable from a software application store, for example from an "App store", to the device 200.

Embodiments of the present disclosure are susceptible to being used for various purposes, including, though not limited to, enabling users to capture graphical image data generated during use of software applications such as game-playing, without materially degrading performance of their portable devices, and facilitating the functionality of capturing the graphical image data, without any requirement to modify software applications and/or graphics engines, apart from simply including a SDK, namely "linking libraries", in the ABIs of the software applications. Such SDK optionally provides additional functionality, for example to enable users to control the graphical image data capture; such functionality optionally requires modifications to be made to the software application to expose such functionality to users. Moreover, as aforementioned, embodiments of the present disclosure enable capture of a combination of image and/or video content in combination with corresponding audio content.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

I claim:

1. A portable computing device comprising computing hardware and a memory, wherein the memory includes non-transitory machine readable instructions comprising a software application with an associated software development kit integrated therewith, and wherein the software application comprises an unmodified graphics engine, and wherein the application has been sandboxed by the operating system, the software development kit being executable upon the computing hardware for capturing graphical image data, the computing hardware being configured to execute one or more software applications for generating graphical image data wherein execution of a software application by the computing hardware causes the application to generate one or more function calls, wherein the one or more function calls are configured to generate the graphical image data, and wherein execution of the software development kit by the computing hardware causes the software development kit to:

intercept the one or more function calls wherein the one or more function calls are configured to generate the graphical image data; and, modify the one or more intercepted function calls; and wherein the modified one or more intercepted function calls are configured by the computing hardware upon execution of the software development kit to cause the graphical image data to be generated in data memory of the portable computing device, wherein the application's software development kit, when executed by the computing hardware, has read and write access to the data memory.

2. The portable computing device as claimed in claim 1, wherein the non-transitory machine readable instructions incorporates the unmodified graphics engine, and the unmodified graphics engine, when executed by the computing hardware, is configured to forward a function call not intercepted by the software development kit directly to the software development kit.

3. The portable computing device as claimed in claim 1, wherein the non-transitory machine readable instructions comprising the unmodified graphics engine, wherein the software development kit comprises a wrapper module that is configured to wrap around the unmodified graphics engine and the one or more function calls pass through the wrapper module, and wherein the wrapper module is configured to modify at least one of the one or more function calls.

4. The method as claimed in claim 1, wherein the software development kit is configured to upload and/or stream the graphical image data to a data store that is spatially remote from the portable computing device.

5. The portable computing device as claimed in claim 1, wherein modifying the one or more intercepted function calls comprises modifying a content of the one or more intercepted function calls.

6. The portable computing device as claimed in claim 1, wherein execution of the software development kit by the computing hardware causes the software development kit to forward the modified one or more intercepted function calls to the unmodified graphics engine.

7. The portable computing device as claimed in claim 1, wherein execution of the software development kit by the computing hardware cause the software development kit to forward the modified one or more intercepted function calls to a graphics library application programming interface.

8. The portable computing device as claimed in claim 1, wherein execution of the software development kit by the computing hardware causes the software development kit to capture the graphical image data.

9. The portable computing device as claimed in claim 8, wherein the software application when executed by the computing hardware, is configured to enable the software development kit to upload and/or stream the graphical image data to a data store that is spatially remote from the portable computing device.

10. The portable computing device as claimed in claim 8, wherein the graphical image data is captured before user interface objects have been added to the graphical image data.

11. A method for capturing graphical image data in a portable computing device, the method comprising:

incorporating a software development kit into an application transparently when the application is built; and executing the application concurrently with the incorporated software development kit on a computing hardware of the portable computing device, wherein the application has been sandboxed by an operating system pf the portable device, wherein execution of the application and the incorporated software development kit on the computing hardware causes the software development kit to:

detect one or more function calls sent by the application, wherein the one or more function calls are configured to generate the graphical image data;

intercept the detected one or more function calls; and modify the intercepted one or more function calls, wherein the modified one or more function calls are configured to generate the graphical image data in data memory of the portable computing device, wherein the application's software development kit has read and write access to the data memory.

12. The method according to claim 11, wherein an unmodified graphic engine is incorporated into the application and execution of the application and the incorporated software development kit by the computing hardware is configured to cause the software development kit to forward the modified one or more function calls to the graphics engine.

13. The method to claim 12, wherein the method includes operating the graphics engine to send a function call not intercepted by the software development kit directly to the software development kit.

14. The method according to claim 12, wherein the software development kit is configured to wrap around the graphics engine so that all function calls to the graphics engine pass through and are modified by the software development kit.

15. The method according to claim 11, wherein execution of the software development kit by the computing hardware is configured to cause the software development kit to forward the modified one or more function calls to a graphics library application programming interface.

16. The method according to claim 11, wherein execution of the software development kit by the computing hardware is configured to cause the software development kit to capture the generated graphical image data from the accessible portion of the memory.

17. The method according to claim 16, wherein execution of the software development kit by the computing hardware is configured to cause the software development kit to capture the graphical image data before user interface objects have been added to the graphical image data.

18. A computer program product comprising computer readable program code stored on non-transitory machine-readable data storage media, wherein the computer readable program code, when executed upon computing hardware of a portable computing device causes the portable computing device to perform the method comprising:

incorporating a software development kit into an application transparently when the application is built; and executing the application concurrently with the incorporated software development kit on a computing hardware of the portable computing device, wherein the application has been sandboxed by an operating system pf the portable device,
wherein execution of the application and the incorporated software development kit on the computing hardware causes the software development kit to:
  detect one or more function calls sent by the application, wherein the one or more function calls are configured to generate the graphical image data;
  intercept the detected one or more function calls; and
  modify the intercepted one or more function calls,
  wherein the modified one or more function calls are configured to generate the graphical image data in data memory of the portable computing device, wherein the application's software development kit has read and write access to the data memory.

* * * * *